Jan. 29, 1952          G. P. LESSMANN          2,583,780

TENSION DEVICE

Filed April 4, 1947          2 SHEETS—SHEET 1

WITNESSES:

INVENTOR
Gerhard P. Lessmann.
BY
ATTORNEY

Jan. 29, 1952 G. P. LESSMANN 2,583,780
TENSION DEVICE
Filed April 4, 1947 2 SHEETS—SHEET 2
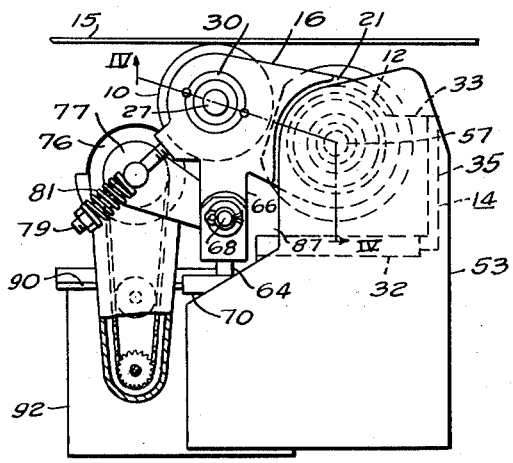
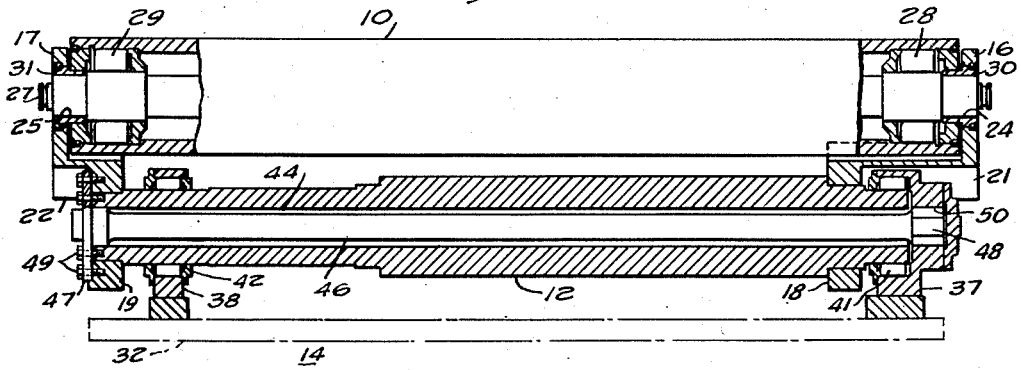
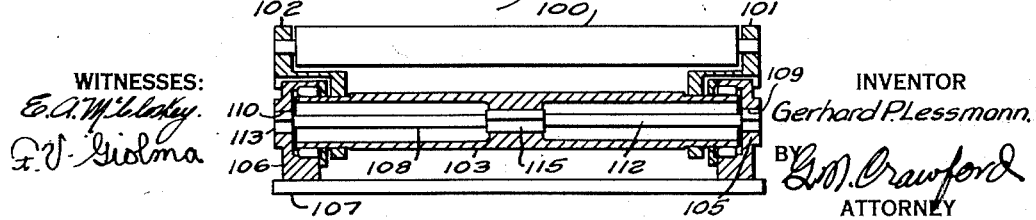
WITNESSES:
INVENTOR
Gerhard P. Lessmann.
BY
ATTORNEY Patented Jan. 29, 1952

2,583,780

UNITED STATES PATENT OFFICE 2,583,780

TENSION DEVICE

Gerhard P. Lessmann, Pittsburgh, Pa., assignor to Westinghouse Electric Corporation, East Pittsburgh, Pa., a corporation of Pennsylvania Application April 4, 1947, Serial No. 739,517

10 Claims. (Cl. 271—2.1)

My invention relates, generally, to tension devices and it has reference, in particular, to strip tensioning devices, sometimes referred to as tensiometers.

Generally stated, it is an object of my invention to provide an improved strip tensioning device or tensiometer which is of simple and compact construction, inexpensive to manufacture, and efficient and reliable in operation.

More specifically, it is an object of my invention to provide a strip tensioning device having a spring incorporated in the fulcrum shaft thereof.

Another object of my invention is to provide for using a torsion spring within a hollow fulcrum shaft of a strip tensioning device for biasing the tension roll toward a predetermined operating position.

A further object of my invention is to provide, in a tensiometer, for using a hollow shaft for mounting the balance structure, and for utilizing a solid shaft extending within the hollow shaft as a spring for biasing the tensiometer roll toward a predetermined position.

Yet another object of my invention is to provide for using an elongated torque shaft for connecting the rotatable balance structure of a strip tensioning device to a relatively stationary supporting structure.

It is also an important object of my invention to provide for applying a lubricant to the roll of a strip tensioning device in order to lubricate a strip of material engaged by the roll.

Another important object of my invention is to provide for combining a strip oiler with a strip tensioning device by so supporting an oiler roll and driving means therefor on the movable balance structure of the tension roll of the strip tensioning device that it supplies a film of oil thereto for lubricating the strip which is engaged by the tension roll.

Other objects will in part be obvious, and will in part be explained hereinafter.

In practicing my invention in one of its forms, a strip tensioning device or tensiometer is provided with a balance structure having a hollow fulcrum shaft which is mounted in bearings on spaced supports. A tension roll is mounted between spaced arms projecting from the hollow shaft. A biasing force for urging the tension roll to bear against the strip is provided by a torque shaft positioned within the hollow shaft of the balance structure. The torque shaft is secured at one end to the hollow shaft, and has a hexagonal head at the other end which is fixed against rotation by being seated in a hexagonal recess in one of the supports. An oiler roll mounted between the arms supporting the tension roll engages the tension roll and applies a film of oil thereto for lubricating the strip as it passes over the tension roll.

For a more complete understanding of the nature and scope of my invention, reference may be made to the following detailed description, which may be read in connection with the accompanying drawings, in which:

Fig. 3 is an end elevational view of the tensioning device;

Fig. 4 is a sectional view taken along the line IV—IV of Fig. 3 and broken out in part to show the mounting arrangement for the tension roll, and Fig. 5 is a sectional view, similar to that of Fig. 4, of a tension device embodying the invention in another of its forms.

Figure 1:
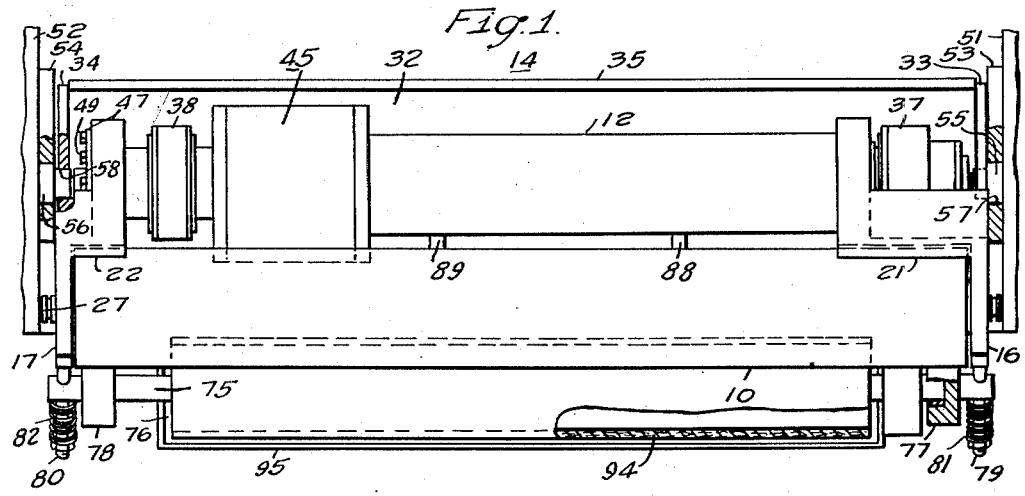
Figure 1 is a plan view, broken out in part, of a strip tensioning device embodying the invention in one of its forms.
Figure 2:
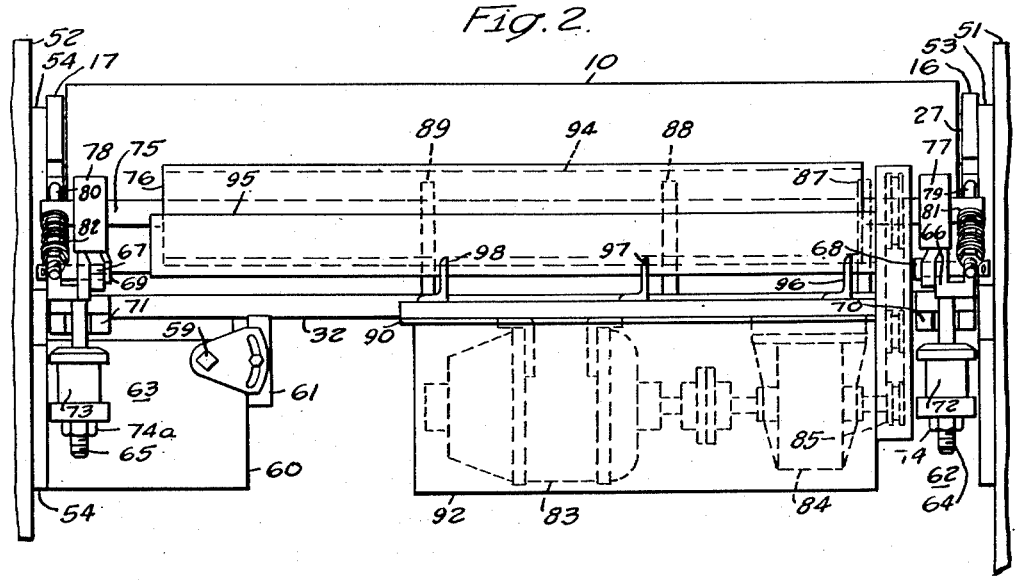
Fig. 2 is a front elevational view of the strip tensioning device shown in Fig. 1.

Referring generally to Figs. 1 through 4, the reference numeral 10 may denote, generally, the tension roll of a strip tensioning device which may be rotatably supported upon a fulcrum shaft 12, which is itself rotatably supported on a balance structure support 14, for engaging a length of strip material 15 as it passes between adjacent roll stands of a rolling mill for either indicating the tension of the strip or regulating the operation of the mill to maintain the tension at a predetermined value.

The tension roll 10, which is disposed to bear against the strip 15, may be rotatably supported from the fulcrum shaft 12 by means of spaced apart arms 16 and 17, having bosses 18 and 19 which may be secured to the fulcrum shaft 12 in any suitable manner. The arms 16 and 17 may have central offset portions 21 and 22, and may be provided with openings 24 and 25 adjacent the free ends for receiving a shaft 27 on which the roll 10 may be mounted by means of internal bearings 28 and 29. Collars 30 and 31 may be fitted in the openings 24 and 25 about the ends of the shaft 27 to retain it in position.

The fulcrum shaft 12 may be mounted on the balance structure support 14, which comprises a base 32 having end members 33 and 34 joined by a back plate 35, in any suitable manner. In this instance, upright supports 37 and 38, mounted on the base 32 and having bearings 41 and 42 supported therein for the fulcrum shaft, are utilized for this purpose. The fulcrum shaft 12 may, for example, comprise a substantially rigid hollow or tubular shaft structure having a central opening or bore 44 throughout its length. Control means, such as a magnetic coupling device 45, may be mounted on the base 32 to detect rotation of the fulcrum shaft 12.

The coupling device may, for example, be of a type described in detail in the copending application of G. P. Lessmann and L. G. Tubbs, patented February 21, 1950, No. 2,498,317.

In order to provide a simple and compact structure, the biasing means for urging the tension roll 10 to bear against the strip 15 may be positioned within the central opening or bore 44 of the fulcrum shaft 12. For example, an elongated torque shaft 46, having a flange 47 at one end and a hexagonal head 48 at the other end, may be utilized as the biasing means. The flange 47 may be secured to the fulcrum shaft 12 and to the boss 19 of the arm 17 by means of bolts 49. The hexagonal head 48 may be fixed against rotation by being seated in a hexagonal recess 50 in the support 37. Accordingly, the torque shaft 46 will bias the tension roll 10 to a predetermined free position. When a downward pressure is exerted on the roll 10 by the strip 15, downward movement of the roll 10 will be opposed by the torque shaft 46 as it is twisted axially by reason of rotational movement of the fulcrum shaft 12 relative to the support 37.

Referring particularly to Figs. 1 and 3, it will be apparent that the balance structure support 14 may be rotatably supported by means of side plates 53 and 54, respectively, which may be secured to the sides 51 and 52 of a mill housing, or the like, in any suitable manner. The side plates 53 and 54 may be provided with pivot pins 55 and 56 which project into openings 57 and 58 in the ends 33 and 34, respectively, of the balance structure support 14. The balance structure support 14 may be moved relative to the side plates 53 and 54 by means of a jackscrew 59, which may be disposed in threaded engagement with a web 60 secured to the side plate 54 and operatively connected to the base 32 by means of a depending lug 61 secured to the base. As the jackscrew 59 is rotated, the lug 61 will be moved backwards or forwards relative to the web 60 thereby pivoting the balance structure support 14 about the pivot pins 55 and 56, whereby the tension roll 10 may be lowered or raised relative to the mill stand.

The spring action of the torque shaft 46 may be modified by means of snubbers 62 and 63, which may be operatively connecting the arms 16 and 17 to the balance structure support 14. The snubbers may comprise clevis bolts 64 and 65 which may be connected to depending lugs 66 and 67 on the arms 16 and 17 by pins 68 and 69, respectively. The stems of the bolts 64 and 65 pass through openings in brackets 70 and 71 secured to the base 32 of the balance structure support 14. Springs or rubber bushings 72 and 73 positioned between washers on the stems by means of nuts 74 and 74a snub upward motion of the tension roll.

In order to provide for lubricating the under surface of the strip 15 as it passes over the tension roll 10, an oiler roll 76 may be provided and mounted on a shaft 75 supported between arms 77 and 78 which may be pivotally mounted on the clevis pins 68 and 69. Biasing means comprising threaded rods 79 and 80 connected to the arms 16 and 17, and springs 81, 82 bias the oiler roll against the tension roll. A motor 83, a gear reduction unit 84 and a chain drive 85 may be provided for driving the oiler roll, if desired. The motor and gear unit may be supported from the base 32 by means of depending web supports 87, 88 and 89 which may be welded to the fulcrum shaft 12 and to an auxiliary base 90 on which the motor and gear unit may be mounted. A housing 92 may be secured to the base 90 for enclosing the motor and gear unit. Oil may be supplied to the oiler roll 76, which may have a felt surface 94, from a semi-cylindrical housing 95 mounted on the auxiliary base 90 by means of angle brackets 96, 97 and 98. By so mounting the roll and its driving motor on the balance structure, errors due to the torque effect of the motor and oiler roll on the position of the tension roll are avoided.

Referring to Fig. 5, the reference numeral 100 denotes a tension roll rotatably supported by means of spaced arms 101 and 102 secured to a fulcrum shaft 103. The fulcrum shaft may be of hollow construction and rotatably mounted on supports 105 and 106 secured to a base 107. A torque shaft 108 extends through the fulcrum shaft, as shown. The ends of the torque shaft 108 may be fixed against rotation in the supports 105 and 106 which may have square or hexagonal recesses 109 and 110 for receiving square or hexagonal end portions 112 and 113 of the torque shaft. The central portion 115 of the torque shaft may also be square or hexagonal in cross section, and it may be seated in a complementary central portion of the hollow fulcrum shaft 103.

As pressure is applied to the tension roll 100 in a downward direction, the arms 101 and 102 move and rotate the ends of the hollow fulcrum shaft 103. In this instance, the fulcrum shaft may be relatively thick-walled so as to be substantially rigid, in which case the movement of the arms is transmitted to the central portion of the torque shaft directly. Accordingly, the torque shaft will be twisted and exerts a torque tending to restore the tension roll to its free position. If desired, the fulcrum shaft 103 may be relatively thin-walled, in which case the twisting will occur between the end portions thereof to which the arms are connected and the central portion where the twisting force will be applied to the torque shaft, as well as in the torque shaft 108. In this instance, both the fulcrum shaft and the torque shaft exert a restoring torque to return the tension roll to its free position.

If it should be desired to have the ends of the tension roll 100 supported separately the fulcrum shaft 103 and torque shaft 108 may be severed at the central section. The adjacent ends may be rotatably supported in supports similar to the end supports 105 and 106.

From the above description and the accompanying drawings it will be apparent that I have provided a relatively simple and compact structure which is easy and inexpensive to manufacture. A strip tensioning device embodying the features of my invention may be readily mounted directly on the housing of the rolling mill or other work device, since the spring mechanism is contained within the fulcrum shaft, and the whole structure occupies a minimum of space. Tensioning devices embodying the features of my invention may be used either for indicating or for regulating the tension in a strip of material. By mounting the oiler roll on the tension roll balance structure errors in the indication of tension resulting from the torque effects of the oiler roll and/or its driving motor, which may run as high as 20%, are eliminated.

Since certain changes may be made in the above-described construction and different embodiments of the invention may be made without departing from the spirit or scope thereof, it is intended that all the matter contained in the above description and shown in the accompanying drawings shall be considered as illustrative and not in a limiting sense.

I claim as my invention:

1. A tension device for tensioning a strip of material as it extends between adjacent work devices, said tension device comprising, a roller disposed to bear against the strip to deflect it from a line between the work devices, a hollow shaft having spaced apart arms supporting the roller, and biasing means including a support and a longitudinal torsion shaft, said torsion shaft being positioned coaxially with respect to said hollow shaft and extending between and fixed against rotation relative to the support and the hollow shaft at spaced apart points.

2. A tensiometer comprising, an elongated roll disposed to bear against a length of material and deflect it from a line between adjacent work devices, a tubular shaft having spaced projecting arms rotatably supporting the roll, and means rotatably supporting the tubular shaft and biasing it to a predetermined position including a base mounted on one of the work devices with spaced support means and an elongated torque shaft extending at least partially within the tubular shaft and fixed against rotation relative to the tubular shaft and one of the support means at spaced points.

3. In a tension device disposed to tension a strip of material between adjacent mill stands, an elongated roller disposed to deflect the strip from a line between the stands, a tubular shaft having projecting arms rotatably supporting the roller, support means including an elongated base mounted on one of the stands, and a torsion shaft positioned coaxially with respect to the tubular shaft, said torsion shaft being positioned at least partially within the tubular shaft and being fixed against rotation relative to the tubular shaft and the base of the support means at spaced apart points so as to resiliently bias the roller toward the strip.

4. A strip tensioning device for a strip rolling mill comprising, a balance structure including a tubular shaft having spaced arms supporting a roller for bearing against a strip material extending between adjacent roll stands of the mill, support means for the tubular shaft, and a torsion shaft, said torsion shaft being positioned coaxially with respect to said hollow shaft and fixed against rotation relative to the support means and the tubular shaft at spaced points so as to resiliently bias the roller against the strip.

5. A tensiometer comprising, spaced arms supporting a roller at its opposite ends, connecting means extending between the arms from points spaced from the ends for supporting the roller and having a substantially axial opening, support means mounted on a base member for rotatably supporting the connecting means, and elongated torsion means biasing the roller to a predetermined position, said torsion means being positioned at least partially within the axial opening and fixed against rotation relative to the support means and connecting means at axially spaced points.

6. A tension device comprising, a hollow shaft having spaced apart arms supporting a work engaging member, support means including an elongated base having upstanding supports rotatably supporting the hollow shaft at spaced apart points, and a torque shaft extending at least partially within the hollow shaft and secured in fixed rotational relation to the hollow shaft and support means at spaced apart points to bias the work engaging member toward the work.

7. A tension device comprising, a roller disposed to engage a strip of material, a balance structure including a hollow shaft having radial arms adjacent the ends to rotatably support the roller in substantially parallel relation, support means including spaced apart bearings rotatably supporting the hollow shaft adjacent its ends, and a torque shaft rigidly connected to the hollow shaft at one end and extending therethrough, said torque shaft being fixed against rotation relative to the support means at the other end so as to resiliently bias the roller toward a predetermined position.

8. A tension device comprising, a hollow shaft having a pair of radial arms adjacent its ends, a roller rotatably supported by the arms for engaging a length of material, support means rotatably supporting the hollow shaft, one of said support means being positioned adjacent one end of the shaft and provided with a non-round recess substantially coaxial with the shaft, and an elongated torsion member extending within the hollow shaft disposed to resiliently bias the roller to engage the material, said torsion member having a complementary non-round portion at one end fitting in the recess in the support and a flange at the other end secured to the hollow shaft.

9. A tension device comprising, a roller, a tubular shaft having a pair of arms supporting the roller, support means rotatably supporting the tubular shaft adjacent its ends, and a torsion member positioned at least partially within the tubular member, said torsion member interfitting with the tubular shaft intermediate its ends and with at least one of the support means, whereby said torsion member is disposed to resiliently bias the roller to a predetermined position.

10. A strip tensioning device, a roller, a hollow shaft having radial arms supporting the roller and an axial opening with a reduced non-round section intermediate the ends, a torque shaft positioned in the hollow shaft having a central non-round section complementary with the non-round opening and projecting end portions, and support means rotatably supporting the hollow shaft and receiving the projecting end portions of the torque shaft to fix them against rotation, whereby said torque shaft is adapted to resiliently bias the roller to a predetermined position.

GERHARD P. LESSMANN.

REFERENCES CITED

The following references are of record in the file of this patent:

UNITED STATES PATENTS

| Number | Name | Date |
|---|---|---|
| 533,443 | De Jonge | Feb. 5, 1895 |
| 925,949 | Rolland | June 22, 1909 |
| 947,537 | Woods | Jan. 25, 1910 |
| 1,008,616 | Sargent | Nov. 14, 1911 |
| 1,319,961 | Lowe et al. | Oct. 28, 1919 |
| 1,409,908 | Affelder | Mar. 21, 1922 |
| 2,021,560 | Lira | Nov. 19, 1935 |
| 2,173,652 | Lee et al. | Sept. 19, 1939 |
| 2,192,044 | Lessmann | Feb. 27, 1940 |
| 2,272,368 | Duffy | Feb. 10, 1942 |
| 2,340,067 | Lessmann | Jan. 25, 1944 |
| 2,438,432 | Edwards | Mar. 23, 1948 |